No. 876,510. PATENTED JAN. 14, 1908.
H. T. WHEELER.
FIRING MECHANISM FOR ORDNANCE.
APPLICATION FILED APR. 1, 1907.

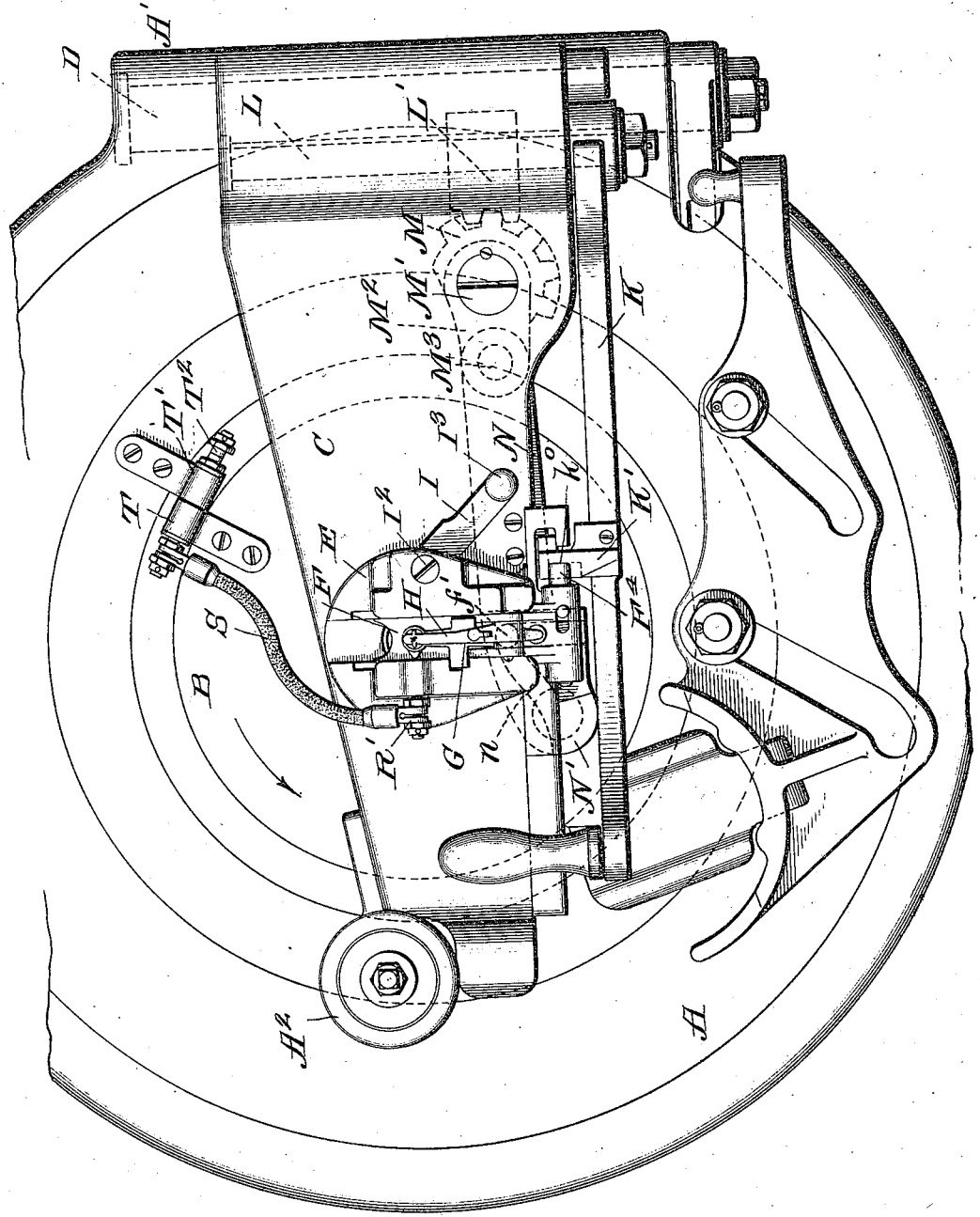

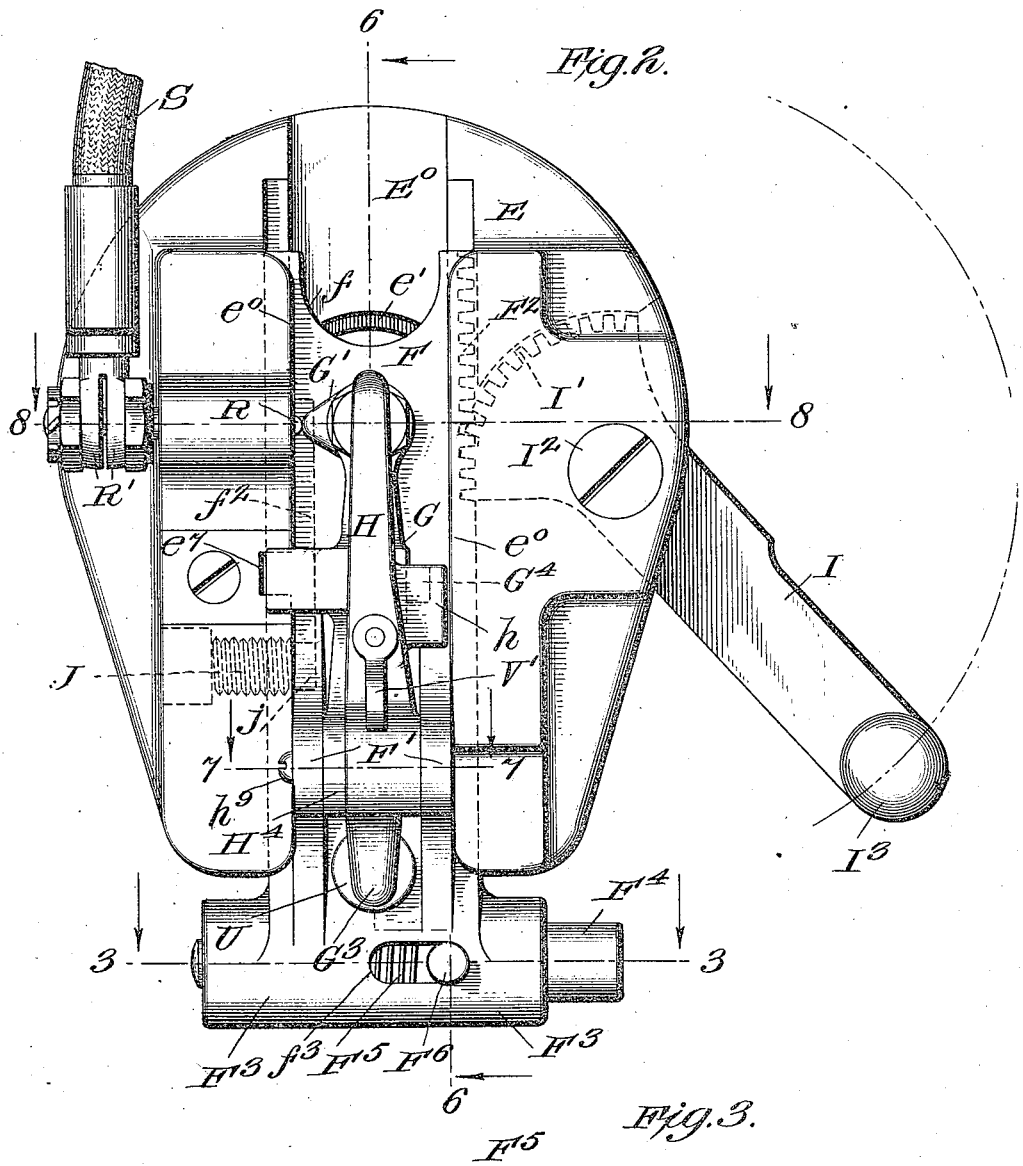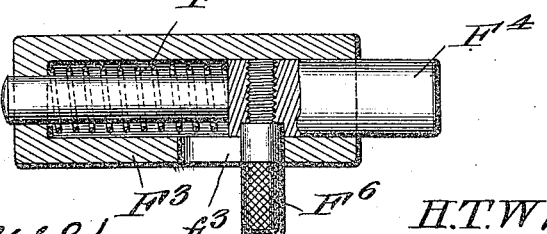

8 SHEETS—SHEET 3.

Witnesses
Geo. H. Pepue
Wm. May. Duvall

Inventor
H. T. Wheeler
By Wilkinson & Fisher
Attorneys

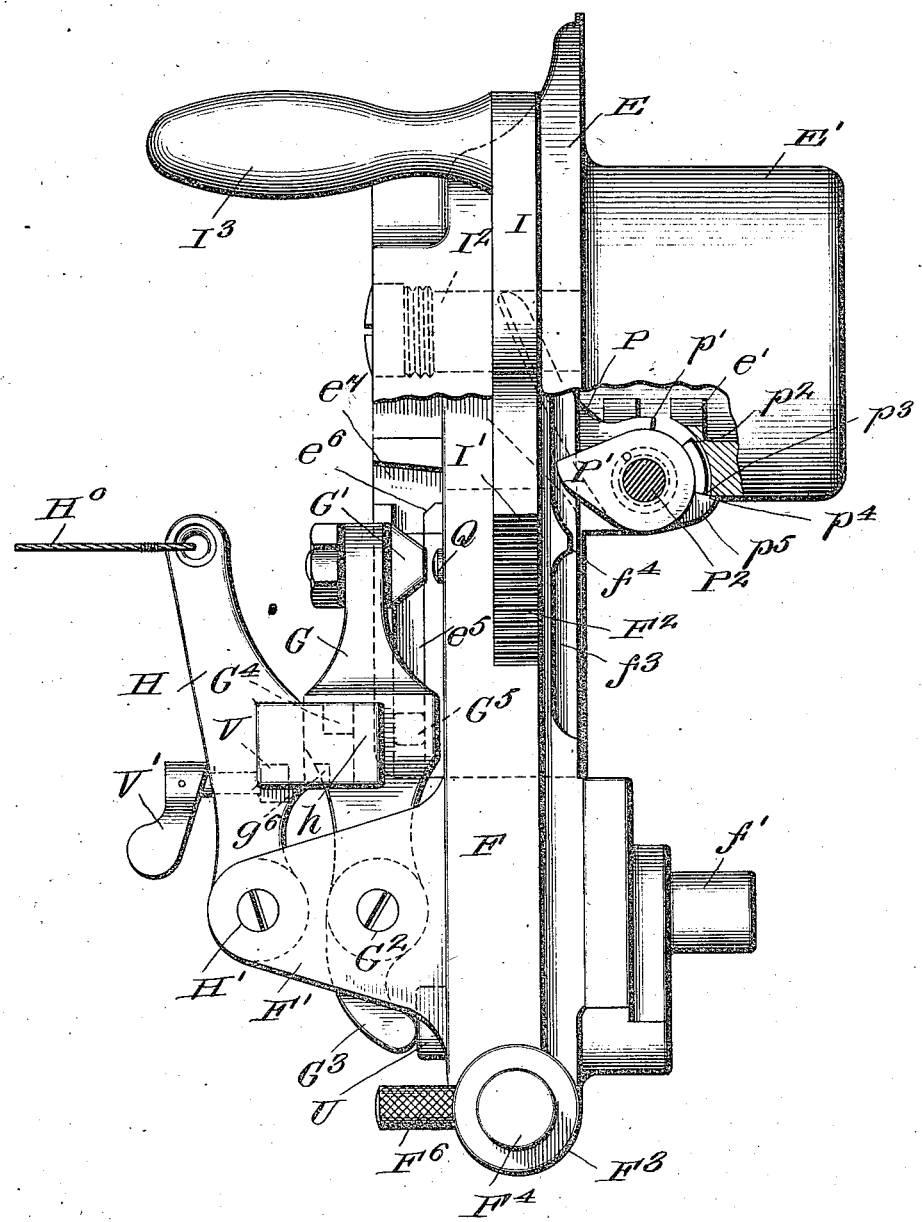

No. 876,510. PATENTED JAN. 14, 1908.
H. T. WHEELER.
FIRING MECHANISM FOR ORDNANCE.
APPLICATION FILED APR. 1, 1907.
8 SHEETS—SHEET 5.
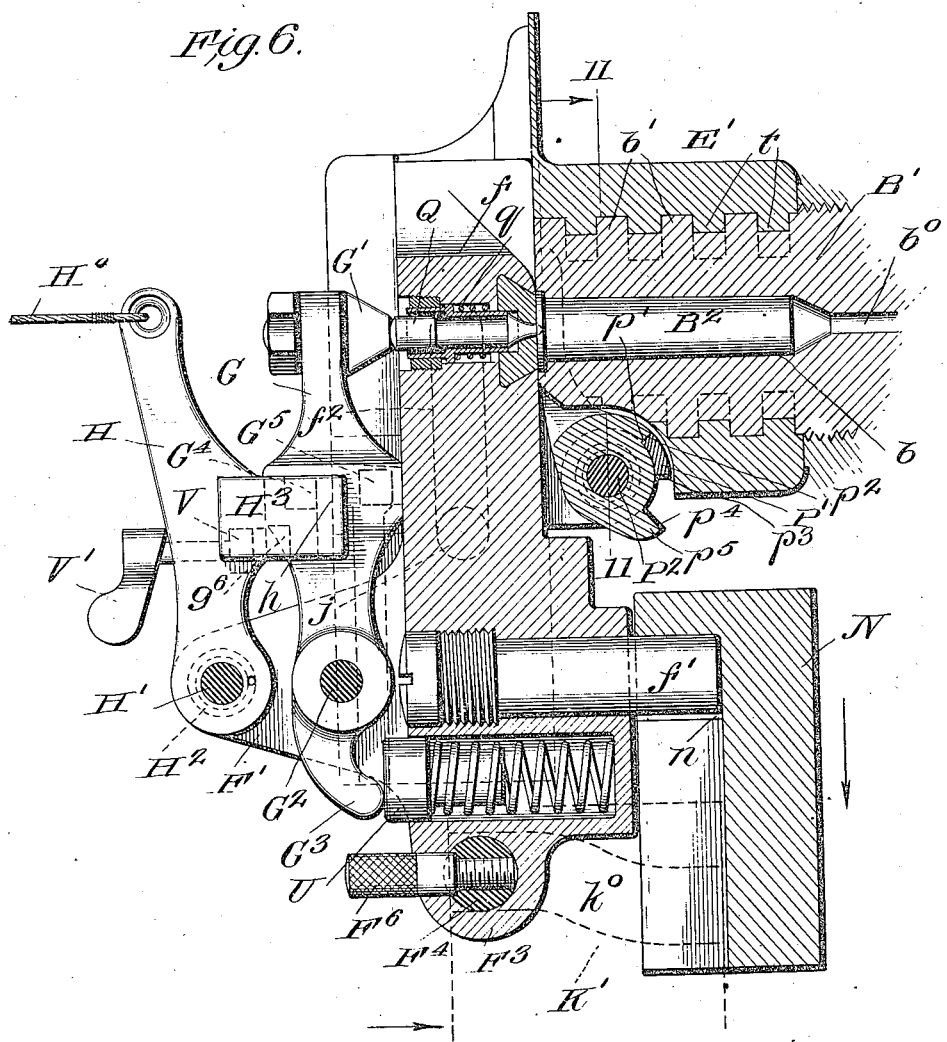
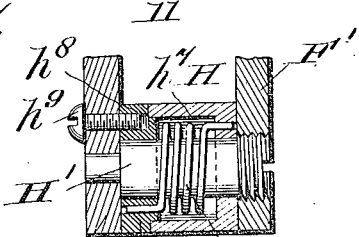

No. 876,510. PATENTED JAN. 14, 1908.
H. T. WHEELER.
FIRING MECHANISM FOR ORDNANCE.
APPLICATION FILED APR. 1, 1907.

8 SHEETS—SHEET 6.

Witnesses
Inventor
H. T. Wheeler,
By Wilkinson & Fisher,
Attorneys

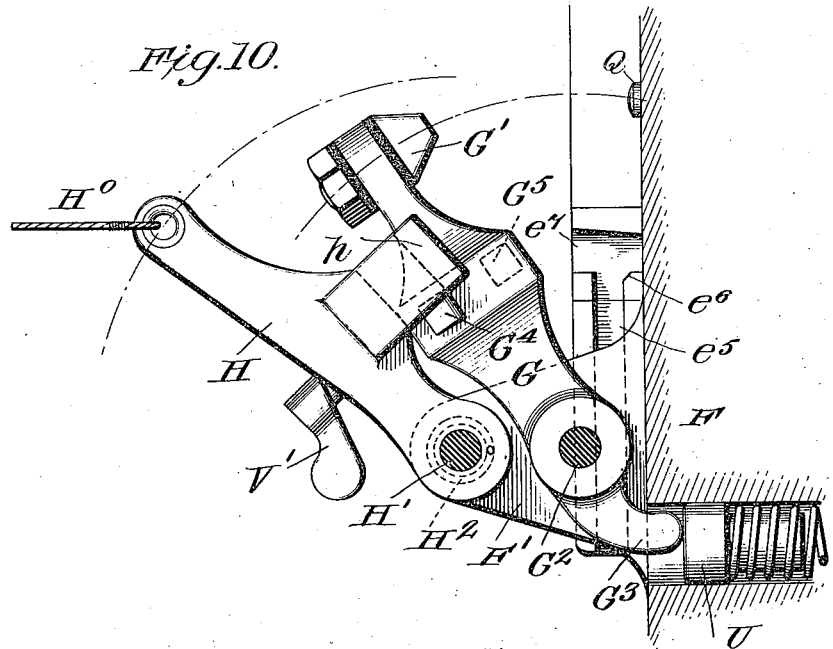
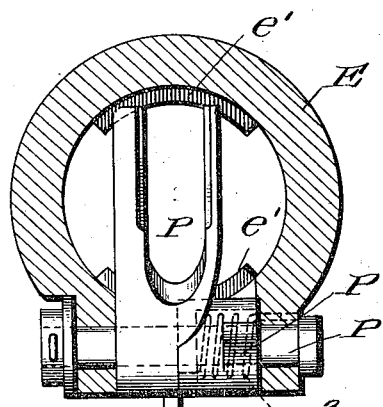
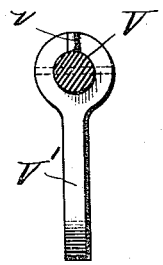
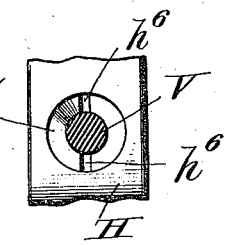
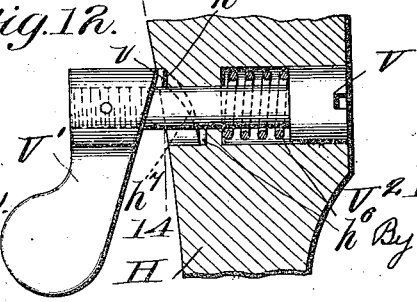

No. 876,510. PATENTED JAN. 14, 1908.
H. T. WHEELER.
FIRING MECHANISM FOR ORDNANCE.
APPLICATION FILED APR. 1, 1907.

8 SHEETS—SHEET 8.

Inventor
H.T. Wheeler
By Wilkinson & Fisher,
Attorneys

Witnesses

UNITED STATES PATENT OFFICE.

HARRY T. WHEELER, OF WASHINGTON, DISTRICT OF COLUMBIA.

FIRING MECHANISM FOR ORDNANCE.

No. 876,510.　　　　　Specification of Letters Patent.　　　　　Patented Jan. 14, 1908.

Application filed April 1, 1907. Serial No. 365,760.

*To all whom it may concern:*

Be it known that I, HARRY T. WHEELER, a citizen of the United States, residing at Washington, in the District of Columbia, have invented certain new and useful Improvements in Firing Mechanism for Ordnance; and I do hereby declare the following to be a full, clear, and exact description of the invention, such as will enable others skilled in the art to which it appertains to make and use the same.

My invention relates to improvements in firing mechanism for ordnance, and it is intended primarily to provide mechanism which may be operated mechanically or electrically, and which may be readily inserted and removed from the gun; and which will be positive and safe in action, and which cannot be operated except when the breech block is in the closed and locked position.

My invention will be understood by reference to the accompanying drawings, which show it as applied to a breech block, which has a rotary motion to lock and unlock the same, and swings into and out of the breech of the gun, but it is applicable to other well known forms of breech mechanism.

Figure 4:
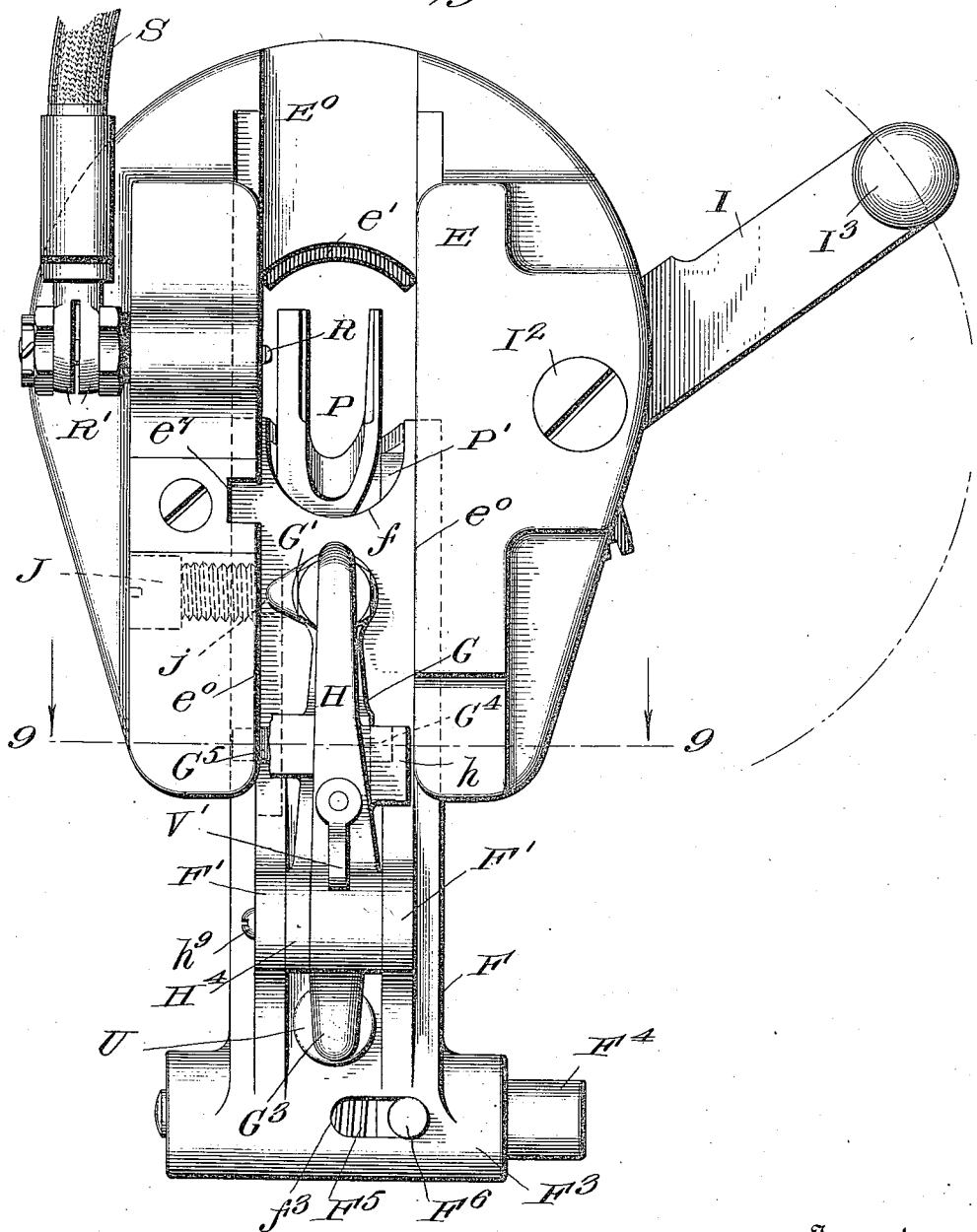
Figure 8:
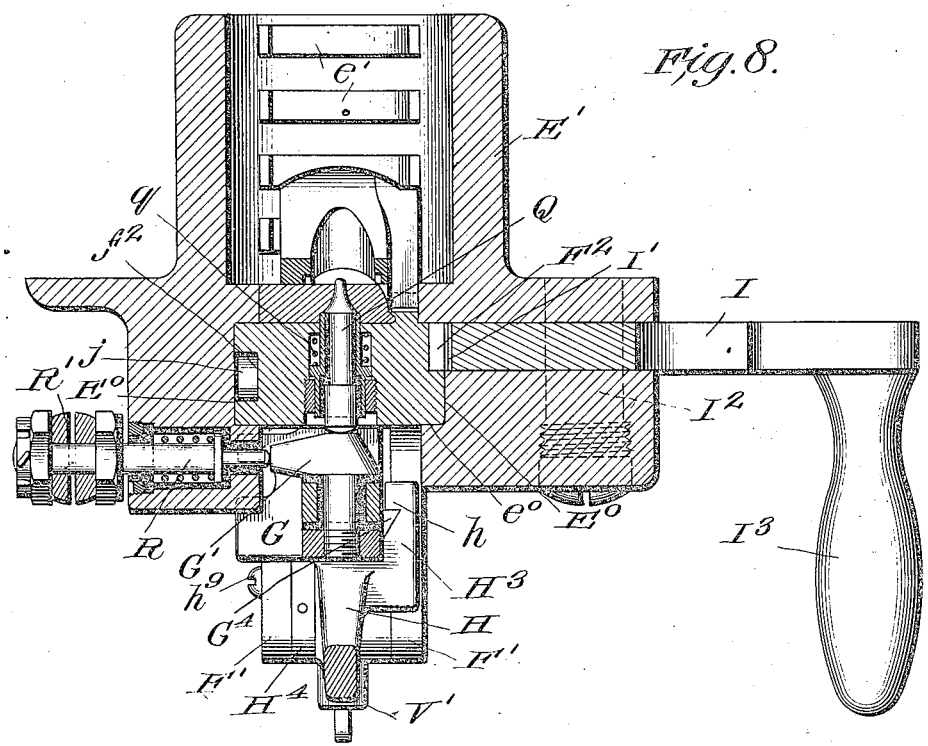
Figure 9:
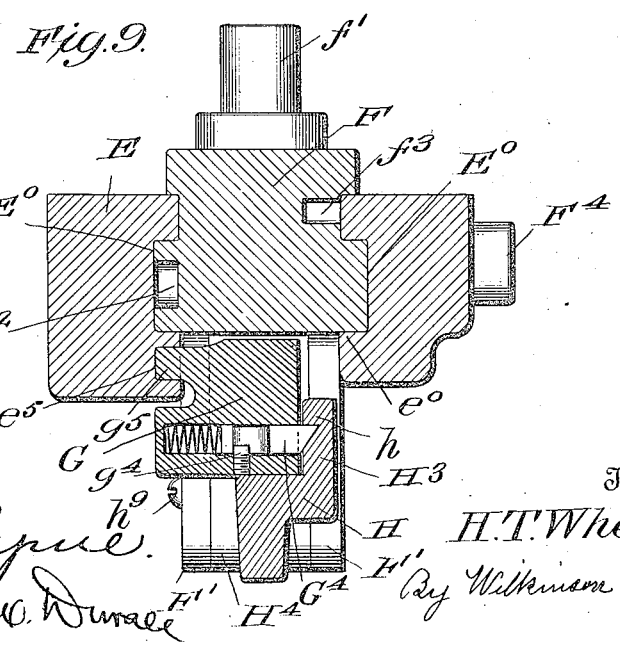
Figure 15:
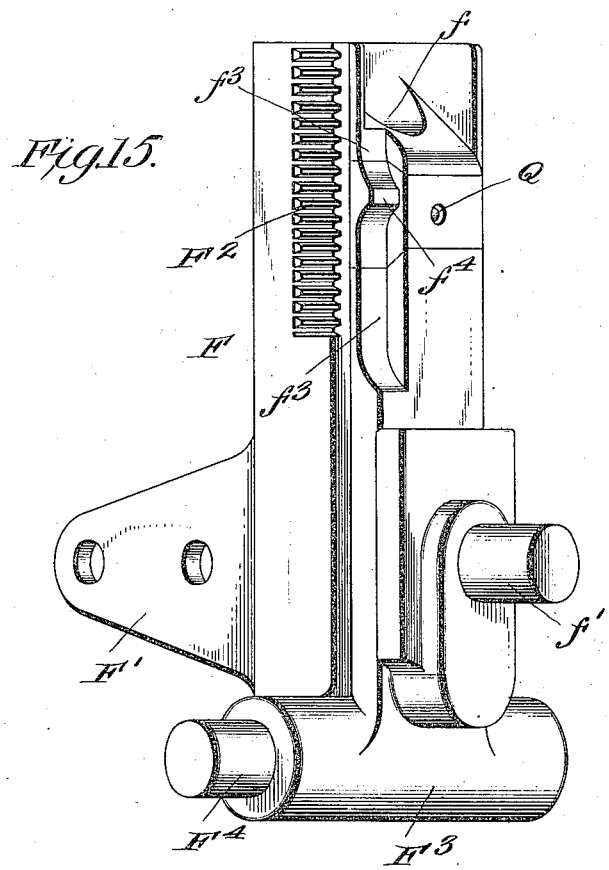
Figure 16:
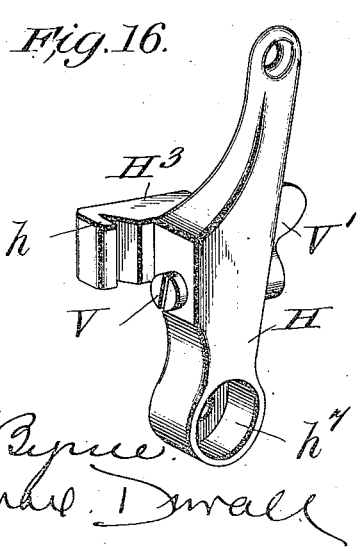
Figure 17:
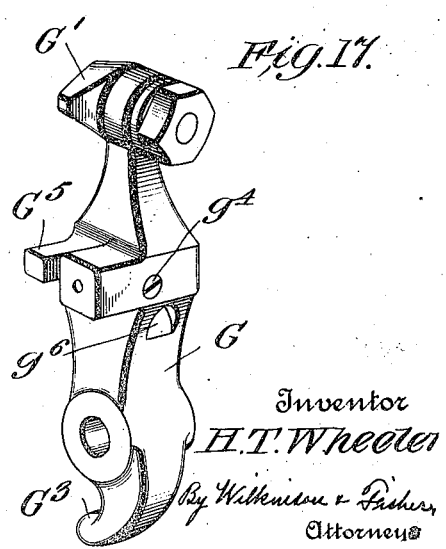

Figure 1 is a rear elevation of the gun fitted with the improved firing mechanism.
Fig. 2 is a rear elevation of the firing mechanism in the position ready for firing, the parts being shown on an enlarged scale from those shown in Fig. 1. Fig. 3 shows a section along the line 3—3 of Fig. 2, and looking in the direction of the arrows. Fig. 4 is a similar view to that shown in Fig. 2, except that the firing mechanism is in the open position, or ready for inserting a fresh primer. Fig. 5 is a side elevation of the firing mechanism in the position shown in Fig. 4, parts being broken away. Fig. 6 shows a section along the line 6—6 of Fig. 2, and looking in the direction of the arrows. Fig. 7 is a section along the line 7—7 of Fig. 2, and looking in the direction of the arrows. Fig. 8 shows a section along the line 8—8 of Fig. 2, and looking in the direction of the arrows. Fig. 9 shows a section along the line 9—9 of Fig. 4, and looking in the direction of the arrows. Fig. 10 is a side elevation of the hammer and cocking lever, and illustrates the use of the apparatus in firing by percussion. Fig. 11 shows a section along the line 11—11 of Fig. 6, and looking in the direction of the arrow. Fig. 12 is a detail showing the lock for locking the hammer to the cocking lever for the purpose of preventing or retarding percussion firing. Fig. 13 shows a section along the line 13—14 of Fig. 12, and looking towards the right, and Fig. 14 shows a section along the line 13—14 of Fig. 12, and looking towards the left. Fig. 15 is a perspective view of the sliding block or wedge, which is used to close the breech of the receiver when the primer is inserted, which wedge carries the cocking lever and hammer, shown in perspective in Figs. 16 and 17 respectively.

A represents the breech of the gun, in which the breech block B engages in the usual way. This breech block is supported on the carrier C hinged to the pin D mounted in the boss A' at one side of the gun.

$A^2$ represents the usual buffer for checking the rebound of the plug in closing.

E represents the receiver carrying the major portion of the firing mechanism. This receiver is provided with a sleeve E' having interrupted annular ribs $e'$, which engage corresponding ribs $b'$ on the stem B' of the mushroom, see Fig. 6, thus forming a bayonet joint, and permitting the receiver to be quickly attached to, or removed from, the stem of the mushroom. This mushroom is of the ordinary type and need not be further described. It is provided with a chamber $b$ for the primer $B^3$, and with a perforation $b^0$, which opens into the powder chamber of the gun. The receiver E is vertically slotted, as at $E^0$, to receive the wedge F, which is held in front of the ribs $e^0$. This wedge is cut away at the top, as at $f$, to facilitate supplying and removing the primer. This wedge F is provided with jaws F', in which the hammer G and cocking lever H are pivoted. This wedge is provided with a rack $F^2$, which engages the sector I' on the repriming lever I, which is pivoted in the receiver, as at $I^2$, and is provided with a handle $I^3$.

The heel of the wedge carries a socket $F^3$, carrying the spring plunger $F^4$ pressed forward by the spring $F^5$, see Figs. 2 and 3, and this plunger is provided with the thumb lug $F^6$, traveling in the slot $f^3$ of the socket $F^3$. By means of this thumb lug, the spring plunger $F^4$ may be withdrawn from engagement with a safety bracket K' on the operating lever K, see Figs. 1 and 6. When this plunger $F^4$ is withdrawn from engagement with the safety bracket, the wedge may be moved up and down by hand, by means of the repriming lever I and the segment I' and rack F²; but when the breech block is in the closed and locked position the spring plunger F⁴ will normally project into a cam groove k⁰ in the safety bracket K', and the wedge is held in the closed and locked position.

The wedge is automatically moved up and down by the operation of the hand lever K in opening and closing the breech, as follows. The hand lever K is fast to the hinge pin L, which carries a worm segment L', shown in dotted lines in Fig. 1, which worm segment meshes with another worm segment M pivoted, as at M', on the carrier C, and this worm segment M is provided with an oppositely disposed arm M² pivoted, as at M³, to the rotating link N. This link N is pivotally connected to the block B, as at N', in the usual well known way. This link N is also provided with a cam $n$, which engages a stud $f'$, and thus when the link N is rocked downward about its pivot, by the rotation of the arm M², it will rotate the breech block in the direction of the arrow (see Fig. 1) for unlocking, and at the same time will cam the wedge F down, thus permitting the primer to be inserted from the rear of the receiver. The wedge will remain down while the breech is open, but when the hand lever is swung back to the position for closing the breech, the cam groove $n$ will cam the stud $f'$ upwards until the wedge F reaches almost the closed position. The further and final closing of the wedge is effected by the spring plunger F⁴ engaging in the cam groove k⁰ in the safety bracket K', which will cam the wedge F further upwards to the finally closed and locked position, indicated in Fig. 6. To limit the travel of the wedge in the up and down direction, a slot $f^2$, shown in full lines in Figs. 8 and 9, and in dotted lines in Figs. 2, 4 and 6, is provided, into which projects the wedge stop screw J, which is provided with a lug $j$, projecting into said slot. The wedge cannot be removed from the receiver until the screw J has been unscrewed far enough to disengage from the slot $f^2$.

The up and down movement of the wedge operates the extractor P, as follows. This extractor is provided with a cam P', which normally projects into the recess $f^3$, at either side of the lug $f^4$, see Figs. 5 and 15. This cam is mounted on the same pin P² as the extractor and is normally held in the position shown in Fig. 6, by means of the coil spring P³, which causes the shoulder $p^2$ to engage a corresponding shoulder $p'$ on the extractor. The extractor cam is also provided with another shoulder $p^3$, which engages a corresponding shoulder $p^4$ on the extractor, when the latter is in the open position, at which time the extractor is held from swinging further open by means of the arm $p^5$, which engages the sleeve E'. As the wedge is raised from the position shown in Fig. 5, the lug $f^4$ will strike the cam P', rocking said cam upwards and causing the shoulder $p^3$ of the cam engaging the shoulder $p^4$ of the extractor, to rock the extractor upwards to the closed position, shown in Fig. 6. After the cam has passed the lug $f^4$, the coil spring P³ will restore the cam to the position shown in Fig. 6. Now, should the wedge be drawn downwards, either by hand or by the action of the hand lever K, the lug $f^4$ will strike the upper side of the cam P' and will cause the shoulder $p^2$ of the cam, engaging the shoulder $p'$ of the extractor, to rock the extractor to the open position, shown in dotted lines in Fig. 5. The parts are shown in Fig. 5 in the position they would assume just after the cam has passed the lug $f^4$, and after it has been returned by the spring P³ to the normal position. Thus it will be seen that the vertical movement of the wedge will automatically operate the extractor.

Q represents an insulated firing pin, which is normally withdrawn by the spring $q$, and is struck by the insulated metal piece G' on the head of the hammer G. This insulated piece G' is electrically connected to the insulated spring contact R and to the binding post R', which is connected by the cable S to the spring contact T, carried by the breech block. This engages a spring contact T' carried by the gun, so that when the breech block is in the closed and locked position these two contacts T and T' will make electrical connection. The contact T' is connected by the binding post T² to any suitable source of electricity, not shown. The hammer G is pivoted on the pin G² in the jaws F', and is provided with an arm G³, which engages the spring plunger U mounted in the plug F, as shown in Figs. 6 and 10. This spring plunger tends to cause the hammer head to strike the firing pin Q. The cocking lever H is pivoted, as at H', in the jaws F', and is normally pressed towards the hammer by means of a coil spring H², shown in Figs. 6 and 7. This spring H² is mounted in a recess $h^7$ in the heel of the cocking lever, and one end of the spring is made fast to the cocking lever H, (see Fig. 7) and the other end is connected to a collar H⁴, which is provided with one or more recesses $h^8$ to engage the set screw $h^9$. The tension of the spring may be varied by moving the screw and turning the collar H⁴ through the requisite angle and then locking the same by means of the set screw $h^9$. The cocking lever is temporarily connected to the hammer for withdrawing the same by means of the hook $h$ on the arm H³ of the cocking lever, and the plunger G⁴ carried by the hammer G, as shown in Fig. 9. This plunger is held in place by the keeper screw $g^4$, engaging in a slot in said plunger, as shown in Fig. 9.

It will be noted that when the hammer and the cocking lever are in the vertical or normal position, that the spring latch G⁴ will engage the hook $h$, as shown in Figs. 8 and 9;

but when the cocking lever is drawn backwards, as shown in Fig. 10, it moves about a different center from the hammer, and the spring latch G⁴ is moved away from the hook h, until it becomes disengaged from said hook and the hammer flies forward under the action of the spring plunger U. Then, if the lanyard H⁰ be slacked off, the spring H² will restore the cocking lever to the initial position, and the spring latch G⁴ will engage the hook h, as before.

In order to lock the parts against firing by percussion, I provide a safety pin V, shown in detail in Figs. 12 to 14, which pin is screwed into the thumb lug V', and is normally pressed outward by the spring V², causing the parts to bind. The hub of the thumb lug V' has a lug v, which projects into a cam groove h⁶ in the cocking lever H. By turning this thumb lug V' in one direction, the lug v will engage in the cam groove, and will press the locking pin V outward to the position shown in Fig. 16, causing the same to engage in the notch g⁶ in the hammer G. This will lock the cocking lever to the hammer, and since the two are pivoted with different centers, the parts will bind, and the cocking lever cannot be drawn back by the lanyard H⁰. Thus, at this time, it will be impossible to fire the gun by percussion. This will not interfere, however, with the hammer head making electrical contact when the wedge is raised to the upper position, and the electric circuit may be then closed by means of a push button, trigger, or in any other well known way.

The hammer G is provided with a safety lug G⁵, which engages in a groove e⁵ in the receiver, one wall of which groove is cut-away, at e⁶, and the other wall slotted rearward, as at e⁷, see Figs. 2, 5 and 10. This termination of the slot e⁵ is at the upper limit of travel of the lug G⁵ as the wedge is moved up into the closed and locked position, and at this time the spring plunger U causes this lug G⁵ to pass the shoulder e⁶ and enter the recess above said shoulder, permitting the hammer head G' to make contact with the firing pin Q, and this hammer head G' will at the same time make lateral contact with the spring contact R, as shown in Fig. 8. At all other times, except when this lug G⁵ is in its upward position, it will engage the inner wall of the guide groove e⁵, and will hold the hammer head clear from contact with the pin Q, and the spring contact R, as indicated in Fig. 5. Thus it will be seen that this lug G⁵ engaging in the guide groove e⁵ will positively hold the hammer against either, being drawn backward for cocking, or being moved forward for firing, either by percussion, or electrically, until the wedge F is in the closed and locked position. Thus it will be seen that the firing mechanism may be conveniently locked against percussion firing, and it will be automatically locked against firing by percussion, or by electricity, until the breech block and wedge are both in the closed and locked position.

While, for the sake of clearness in the drawings, I have shown the device as provided with a lanyard for percussion firing, this being probably the simplest apparatus adapted to the purpose; it will be obvious that any suitable well known trigger operated mechanism may be substituted for the lanyard if desired.

It will be obvious that various modifications might be made in the herein described apparatus, which could be used without departing from the spirit of my invention.

Having thus described my invention, what I claim and desire to secure by Letters Patent of the United States, is:—

1. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, combined percussion and electric firing mechanism carried by said wedge, and means for automatically locking said firing mechanism against operation except when the breech block is in the closed and locked position, with means for locking said firing mechanism against percussion firing, but without affecting the electric firing, substantially as described.

2. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer pivoted to said wedge and provided with an insulated head adapted to close an electric circuit through the primer when in the firing position, means for automatically locking said hammer out of the firing position except when the breech block is closed and locked and the wedge is in the closed position, and means for cocking and releasing said hammer, with means for locking said hammer against percussion firing, when desired, substantially as described.

3. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer and a cocking lever pivoted to said wedge and swinging about different centers, means for automatically holding said hammer out of the firing position except when the breech block is closed and locked and the wedge is in the closed position, and means actuated by said cocking lever for cocking and releasing said hammer, substantially as described.

4. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer provided with an insulated head adapted to close an electric circuit through the primer when the hammer is in the firing position, and a cocking lever, both pivoted to said wedge and swinging about different centers, means for automatically holding said hammer out of the firing position except when the breech block is closed and locked and the wedge in the closed position, and means actuated by said cocking lever for cocking and releasing said hammer, with means for locking said cocking lever and said hammer together when desired, and thus preventing backward motion of said hammer and prohibiting percussion firing, but permitting electric firing, substantially as described.

5. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, combined percussion and electric firing mechanism carried by said wedge, and means for automatically locking said firing mechanism against operation except when the breech block is in the closed and locked position, with means for locking said firing mechanism against percussion firing, but without affecting the electric firing, an extractor for the primer case mounted in the receiver, and means controlled by the reciprocation of the wedge for operating said extractor, substantially as described.

6. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer pivoted to said wedge, and provided with an insulated head adapted to close an electric circuit through the primer when in the firing position, means for automatically locking said hammer out of the firing position except when the breech block is closed and locked and the wedge is in the closed position, and means for cocking and releasing said hammer, with means for locking said hammer against percussion firing, when desired, an extractor for the primer case mounted in the receiver, and means controlled by the reciprocation of the wedge for operating said extractor, substantially as described.

7. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer and a cocking lever pivoted to said wedge and swinging about different centers, means for automatically holding said hammer out of the firing position except when the breech block is closed and locked and the wedge is in the closed position, and means actuated by said cocking lever for cocking and releasing said hammer, an extractor for the primer case mounted in the receiver, and means controlled by the reciprocation of the wedge for operating said extractor, substantially as described.

8. In a breech loading gun, the combination with a receiver for the primer mounted on the breech block, of a wedge sliding in a guide way in said receiver, means operated by the breech operating mechanism for automatically reciprocating said wedge, independent means operable by hand for reciprocating said wedge, a spring impressed hammer provided with an insulated head adapted to close an electric circuit through the primer when the hammer is in the firing position, and a cocking lever, both pivoted to said wedge and swinging about different centers, means for automatically holding said hammer out of the firing position except when the breech block is closed and locked and the wedge is in the closed position, and means actuated by said cocking lever for cocking and releasing said hammer, with means for locking said cocking lever and said hammer together when desired, and thus preventing backward motion of said hammer and prohibiting percussion firing, but permitting electric firing, an extractor for the primer case mounted in the receiver, and means controlled by the reciprocation of the wedge for operating said extractor, substantially as described.

In testimony whereof, I affix my signature, in presence of two witnesses.

HARRY T. WHEELER.

Witnesses:
 WILLIE R. ADAMS,
 SAML. D. COLE.